(12) United States Patent
Hong et al.

(10) Patent No.: US 10,125,495 B2
(45) Date of Patent: Nov. 13, 2018

(54) ROOF COVERING MATERIAL AND METHOD OF MANUFACTURING

(71) Applicant: CertainTeed Corporation, Malvern, PA (US)

(72) Inventors: Keith C. Hong, Litiz, PA (US); Ming Liang Shiao, Collegeville, PA (US); Husnu M. Kalkanoglu, Swarthmore, PA (US); Gregory F. Jacobs, Oreland, PA (US)

(73) Assignee: CertainTeed Corporation, Malvern, PA (US)

( * ) Notice: Subject to any disclaimer, the term of this patent is extended or adjusted under 35 U.S.C. 154(b) by 0 days.

(21) Appl. No.: 14/945,504

(22) Filed: Nov. 19, 2015

(65) Prior Publication Data

US 2016/0069081 A1 Mar. 10, 2016

Related U.S. Application Data

(62) Division of application No. 12/601,330, filed as application No. PCT/US2009/035384 on Feb. 27, 2009, now Pat. No. 9,217,249.

(60) Provisional application No. 61/033,235, filed on Mar. 3, 2008.

(51) Int. Cl.
*B32B 37/24* (2006.01)
*B32B 38/10* (2006.01)
(Continued)

(52) U.S. Cl.
CPC .............. *E04D 5/10* (2013.01); *B32B 37/24* (2013.01); *B32B 38/10* (2013.01); *E04D 5/12* (2013.01);
(Continued)

(58) Field of Classification Search
CPC .............. E04D 5/10; E04D 11/02; E04D 5/12
See application file for complete search history.

(56) References Cited

U.S. PATENT DOCUMENTS

| 3,276,906 A | 10/1966 | Nielsen |
| 3,922,425 A | 11/1975 | Plumberg |

(Continued)

FOREIGN PATENT DOCUMENTS

| JP | H08-326229 A | 12/1996 |
| WO | 00/039418 A1 | 7/2000 |
| WO | 03/031748 A2 | 4/2003 |

OTHER PUBLICATIONS

International Search Report for International Patent Application No. PCT/US2009/035384, dated Oct. 15, 2009.
(Continued)

*Primary Examiner* — Xiao S Zhao
(74) *Attorney, Agent, or Firm* — McDonnell Boehnen Hulbert & Berghoff LLP

(57) ABSTRACT

A roof covering material is provided, as well as its method of manufacture, wherein a substrate, preferably of a fibrous material is provided, with a bituminous material, preferably asphalt coating, on opposite surfaces thereof, with granules being applied to an upper surface thereof and at least partially embedded in the bituminous material, and with a discontinuous top layer applied to the granule/bituminous material. The discontinuous top layer is preferably a polymeric material, and openings are provided therein, for passage of fluids therethrough, to avoid moisture, volatiles, and other fluid materials from being trapped beneath the top layer. Various techniques for application of the various materials, and for chemical treatment, are likewise provided.

14 Claims, 3 Drawing Sheets

(51) Int. Cl.
*E04D 5/10* (2006.01)
*E04D 5/12* (2006.01)
*E04D 11/02* (2006.01)
*B32B 38/00* (2006.01)

(52) U.S. Cl.
CPC ........ *E04D 11/02* (2013.01); *B32B 2037/243* (2013.01); *B32B 2038/0052* (2013.01); *B32B 2305/30* (2013.01); *B32B 2395/00* (2013.01); *B32B 2419/06* (2013.01); *Y10T 428/22* (2015.01)

(56) References Cited

U.S. PATENT DOCUMENTS

| | | |
|---|---|---|
| 4,352,837 A | 10/1982 | Kopenhaver |
| 5,181,361 A | 1/1993 | Hannah et al. |
| 5,375,491 A | 12/1994 | Hannah et al. |
| 6,038,826 A | 3/2000 | Stahl et al. |
| 6,092,345 A | 7/2000 | Kalkanoglu et al. |
| 6,355,132 B1 | 3/2002 | Becker et al. |
| 6,426,309 B1 | 7/2002 | Miller et al. |
| 6,440,216 B1 | 8/2002 | Aschenbeck |
| 6,444,291 B2 | 9/2002 | Phillips et al. |
| 6,709,994 B2 | 3/2004 | Miller et al. |
| 6,920,730 B2 | 7/2005 | Becker et al. |
| 9,217,249 B2 | 12/2015 | Hong et al. |
| 2005/0238848 A1 | 10/2005 | Fensel et al. |
| 2008/0008858 A1* | 1/2008 | Hong .................. E04D 5/12 428/143 |

OTHER PUBLICATIONS

International Preliminary Report on Patentability for International Patent Application No. PCT/US2009/035384, dated Sep. 7, 2010.

\* cited by examiner

ROOF COVERING MATERIAL AND METHOD OF MANUFACTURING

CROSS-REFERENCE TO RELATED APPLICATION(S)

This application is a division of pending U.S. patent application Ser. No. 12/601,330 filed Mar. 31, 2010, which was a national stage application of PCT/US2009/35384, filed Feb. 27, 2009, which claimed the priority of U.S. provisional application 61/033,235 filed Mar. 3, 2008, the complete disclosures of which are herein incorporated by reference.

BACKGROUND OF THE INVENTION

It is known in the art of roofing, to manufacture roof covering materials of the shingle or tile type by applying granules to a bituminous coated substrate, for use as roofing shingles, or as a rolled roofing product.

Typically, the substrate is a fiberglass or natural fiber mat, that is coated on its opposite sides with a bituminous material, generally asphalt, usually by immersing the mat in the bituminous material. Then, it is known to apply granules of a given size, to the surface of the bituminous coated substrate that is to be weather-exposed in the installed condition on a roof Usually smaller particles, such as sand, mica or talc are applied to the opposite side of the bituminous coated mat, to prevent adjacent shingles in a stack of shingles that are being shipped to the site of application, from sticking to each other, and to make the resultant shingles or other roof covering material more easily handleable. Often the shingle material is then cut to form various shapes, such as three-four tab shingles, rolled roofing, or the like. Various aesthetic effects may be obtained by using different cuts to form slots or spaces between adjacent tabs, and/or by using granules of different colors or different color combinations, to achieve different aesthetic or ornamental effects.

Representative known techniques include those disclosed in U.S. Pat. Nos. 6,038,826; 6,092,345; 6,355,132; 4,352,837; 5,181,361; 5,375,491 and many others.

The granules that are applied to the weather-exposed surfaces of the shingles or other roof covering material are generally, in part, embedded in the bituminous material, and the portions of the granules that are not thus embedded protect the surface of the bituminous material from absorbing excess heat from sunlight. Frequently the granules also deflect ultraviolet light, and the granules can also be treated with antifungal solutions, solar reflective treatments, color retention solutions, flame retardants, and many other substances.

Because the granules are applied to the weather-exposed surfaces of the roofing materials, the granules can become damaged by roofing workers walking on the roof, which may crush or dislodge the granules or otherwise damage the granules or weaken their adhesion to the roofing materials. Additionally, granules can become damaged or dislodged by impact from being struck by objects such as hail, ice, snowballs, tree branches falling on the roofing materials and likewise dislodging or damaging the granules, or by any other means by which the granules of roofing products may be subject to abuse.

SUMMARY OF INVENTION

The present invention is directed to providing a roof covering material and a method of manufacturing a roof covering material, wherein granules are at least partially embedded in a bituminous material coating of a substrate, and wherein a top layer of protective coating is applied to portions of the granules and bituminous material, in a discontinuous manner that allows for passage of any fluid from beneath the discontinuous top layer, through the discontinuous top layer, to avoid trapping moisture, water, air, volatile products, or other gases or fluids therebeneath. The discontinuous nature of the top layer can also serve to reduce crack propagation when various objects, such as ice, snow, hail, tree branches, etc. may form minor cracks in the roofing material, to interrupt the growth of cracks that may occur and/or, to provide direction of crack propagation resulting from impacts to the roof covering material.

Accordingly, it is a primary object of this invention to provide a roof covering material and a method of manufacturing the same, wherein a discontinuous top layer is applied to a surface of a substrate that has a bituminous material at least partially embedded therein, with granules applied thereto.

It is a further object of this invention to accomplish the above object, wherein the discontinuous top layer is a polymeric material.

It is a yet another object of this invention to accomplish the above objects, wherein the discontinuous top layer allows for passage of fluid therethrough to avoid entrapment of fluids, including volatile components, beneath the discontinuous top layer.

It is a further object of this invention to accomplish the above objects, wherein the discontinuous top layer provides means for reducing and/or controlling crack propagation that may result from impact to the roofing material.

Other objects and advantages of the present invention will be readily apparent upon a reading of the following brief descriptions of the drawing figures, the detailed descriptions of the preferred embodiments, and the appended claims.

BRIEF DESCRIPTION OF THE DRAWING FIGURES

FIG. 1 is a schematic representation of the manufacture of a roof covering material, wherein a substrate is provided in the form of a roll, which runs through an accumulator, and then into a tank in which a bituminous material is applied thereto, followed by the application of granules to an upper surface thereof, with a discontinuous top layer then being applied to an upper surface thereof that is to be the weather-exposed surface when the roof covering material is in an installed condition on a roof.

DETAILED DESCRIPTIONS OF THE PREFERRED EMBODIMENTS

Figure 1:
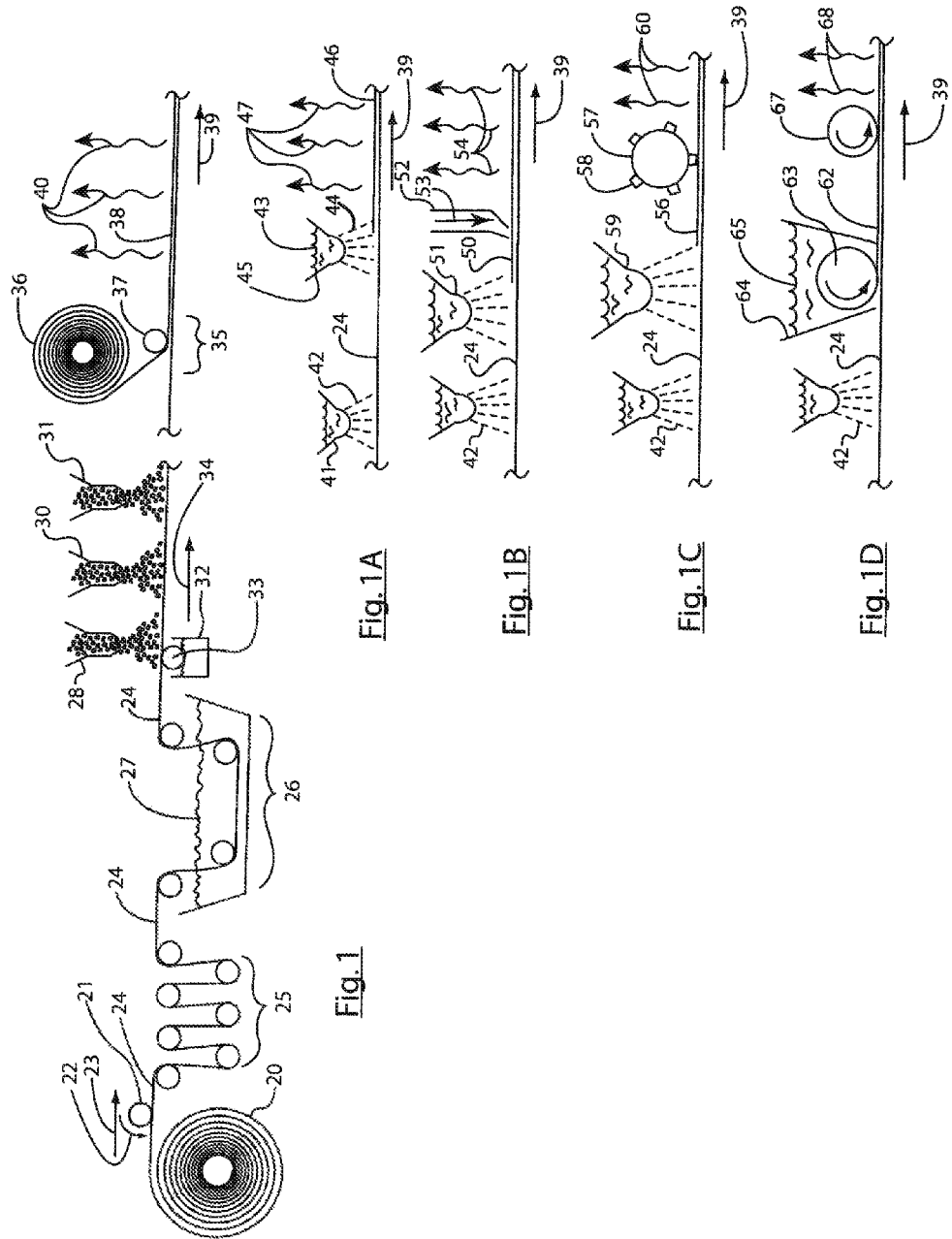
FIG. 1A is a fragmentary schematic illustration similar to that of FIG. 1, wherein a chemical pre-treatment is applied to a roof covering material that already has a bituminous coating and granules applied to an upper surface thereof, and wherein the discontinuous top layer is applied via a spray application.
FIG. 1B is an illustration similar to that of FIG. 1A, but wherein the discontinuous top layer is applied via a spray technique, in a somewhat heavier form than that illustrated in FIG. 1A, and wherein an air knife is used to enhance the discontinuous nature of the top layer.
FIG. 1C is an illustration also similar to that of FIG. 1B, but wherein a textured roller is used to enhance the discontinuous nature of the top layer.
FIG. 1D is an illustration similar to that of FIG. 1C, but wherein the discontinuous top layer is applied via a roller application, followed by a squeeze wiper roller enhancing the discontinuous nature of the top layer.

Referring to the drawings now, in detail, reference is first made to FIG. 1, wherein a substrate for a roof covering material of the shingle or tile or roll roofing type is provided, in the form of a roll 20 of substrate. The substrate 24 may be of a fiberglass or natural fiber material, as may be desired, and may be in a form of a mesh or the like, also if desired. The substrate 24 is unrolled from the roll 20, being pulled therefrom by means of a drive roll or the like 21, driving in the direction of the arrow 22, such that the substrate forms a generally horizontal path as it is unrolled, in the direction of the arrow 23.

Generally, the substrate 24 then passes through an accumulator zone 25, wherein a series of upper and lower rollers allows to assure a constant feed of the substrate 24 to a bitumen application zone 26, in which the substrate 24 passes over and/or under a plurality of rollers, in order to have bitumen 27, preferably in the form of an asphalt material, applied thereto, at least on opposite surfaces of the substrate 24, and generally embedded within the thickness of the substrate, as well.

Upon leaving the bitumen application zone 26, the web 24 passes under at least one, and preferably a plurality of granule application hoppers 28, 30, 31, that dispense granules therefrom, to fall generally by means of gravity, onto the upper surface of the then bitumen-coated web 24. Generally, the different granule dispensers 28, 30, 31 will dispense granules of different colors and/or sizes, in accordance with some predetermined pattern. After the web 24 passes by the granule dispensing stations, the upper surface thereof will be substantially completely covered by granules that are at least partially embedded in the bituminous material coating on the upper surface of the web 24.

The granules that are applied via stations 28, 30, 31, or any of them, may be any of rhyolite, nepheline syenite, syenite, talc, mica, sand, quartz, marble, dolomite, slate, greenstone, crushed brick, ceramic grog, glass, slag, clay, silicate, granite, coke, seashells, silica, limestone, graphite, aluminum, iron and mixtures of any of them.

Beneath the substrate, after the substrate 24 leaves the bitumen application station 26, small particles may be applied by any means, such as by the roller application device 32 in FIG. 1, wherein a roller 33 picks up small particles within the device 32, for applying talc, sand, mica, or other small particles to the lower surface of the substrate 24, to adhere to the bitumen coating thereon. The application of such particles to the lower surface of the substrate 24, facilitates the prevention of shingles or other roof covering material made from the final product, from sticking to each other, when they are stacked or rolled, for shipment, after the roof covering material has been manufactured. It will be understood that any other means than the device 32 may be used for applying particles to the rear surface of the substrate 24, by such techniques as are known in the art.

After application of the granules via any of granule applicators 28, 30, 31 to the substrate 24, the substrate is delivered rightward, in the direction of the arrows 34, 39 to a station 35, wherein a discontinuous top layer is applied to at least some of the upper surface of the bitumen that has been applied to the substrate, and to at least some portions of granules that have been applied thereto. At the station 35 illustrated in FIG. 1, the discontinuous top layer is applied in the form of a roll 36 of such top layer material, to the upper surface as shown in FIG. 1, via a roller 37 or the like, or by any other means that can be used to apply or press the discontinuous top layer to the granule/bituminous material of the substrate, while the bituminous material is still soft and has the ability to adhere the discontinuous top layer thereto.

Because of the discontinuous nature of the discontinuous top layer, having voids therein (not shown in FIG. 1), there are sufficient openings in the discontinuous top layer 38 to allow for passage of fluids therethrough, from therebeneath, in the direction of the arrows 40 illustrated in FIG. 1. Such fluids may be in the form of air, moisture, volatile components of the substrate, volatile components of the applied bitumen, or other gasses, with or without water or other liquid molecules or other particles therein, to avoid such substances from becoming trapped beneath the top layer 38. "Fluids" as used herein shall include various volatiles as addressed above and other miscellaneous volatiles, including volatile oils, lighter components of an asphalt composition, fluids resulting from a manufacturing process, or the like.

The discontinuous top layer may be a polymeric material and preferably a substantially transparent polymeric material, most preferably selected from the group consisting of polyolefin, ethylene vinyl acetate, acrylic, polyvinylbutyral, polyurethanes and mixtures thereof.

The discontinuous top layer 38 may take many forms, as will be addressed hereinafter.

With reference now to FIGS. 1A, 1B, 1C and 1D, other forms of application of discontinuous top layers will be apparent, all after application of granules to the bitumen-coated substrate 24.

In FIG. 1A, for example, a chemical pre-treatment is shown being applied at station 41, in the form of a spray 42, to the upper surface that is comprised of granules at least partially embedded in the bitumen-coated substrate, followed by a spray application of a liquid substance 43, being applied via a spray or other technique 44, from a station 45, to apply a discontinuous top layer 46, alternative to the discontinuous top layer 38 of FIG. 1. Fluids may pass through the layer 46, as are represented by the arrows 47 in FIG. 1A, in an analogous manner to that illustrated in FIG. 1.

In FIG. 1B, a pretreatment liquid is likewise applied to the granule and bituminous coated substrate 24, similar to that described above with respect to FIG. 1A, as is a top layer 50 applied via a station 51, similar to that applied in FIG. 1A at station 45. However, in FIG. 1B, the application of the top layer 50 is more continuous, but is made to be discontinuous, by means of an air knife 52, blowing air 53 rearwardly, or leftwardly as shown in FIG. 1B while the roof covering moves in the direction of arrow 39, to partially remove some portion of the applied top layer 50, to ensure that the resultant top layer after passing by the air knife 52, is discontinuous, having voids therein, to allow for passage of fluids therethrough, as shown by the arrows 54, similar to that described above with respect to FIGS. 1 and 1A.

In FIG. 1C, a pre-treatment chemical 42 as applied to the granule and bitumen coated web 24 similar to that described above with respect to FIGS. 1A and 1B, and a liquid that will form the top layer 56 is applied thereto via the top layer application station 52, similar to that 51 of FIG. 1B, and then that coating or layer 56 is made discontinuous by means of contact with a textured roller 57 having textured portions 58 thereon while the roof covering in the direction of arrow 39, to partially remove the layer 56, to make the same discontinuous, allowing for fluids to pass therethrough, as represented by the arrows 60, similar to that described in the figures above.

With reference now to FIG. 1D, a chemical pre-treatment 42 is applied to the granule and bitumen coated substrate 24, similar to that described above with respect to FIGS. 1A, 1B and 1C, and then the coating 62 is applied thereto, in the form of a roller applicator 63 disposed in a tank 64 of liquid 65, with the thus-applied material then moving in the direction of the arrow 39, to pass beneath a wiper mechanism 67 or the like, in the form of a roller or the like, to make the layer 62 that is thus applied, to be discontinuous, allowing for fluids to pass therethrough as shown by the arrows 68, similar to that described above for FIGS. 1, 1A, 1B and 1C.

It will be understood that the chemical pre-treatment 42 that is applied as described above with reference to FIGS. 1, 1A, 1B, 1C and 1D could modify the surface chemistry of the roofing granules so that the wetting or de-wetting behavior of the coating can be tailored to form portions of the applied film or coating that are continuous and other portions that are discontinuous, for example, in the form of islands over the granule-covered bituminous material. Such pre-treatment can be in the form of reagents that affect surface characteristics of the granules, and can range from simple compounds such as water, to various active chemicals or surfactants, depending upon the specific coating requirements. Such chemicals or surfactants may, for example, include organic compounds, especially the chlorinated compounds, detergents, or non ionic, cationic or anionic surfactants. Coupling agents such as organosilanes, organotitanates or organozirconates may be employed. Further, a plasma etching or cleaning process may be used with or without an inert atmosphere and with or without the addition of other reactive species.

Figure 2:
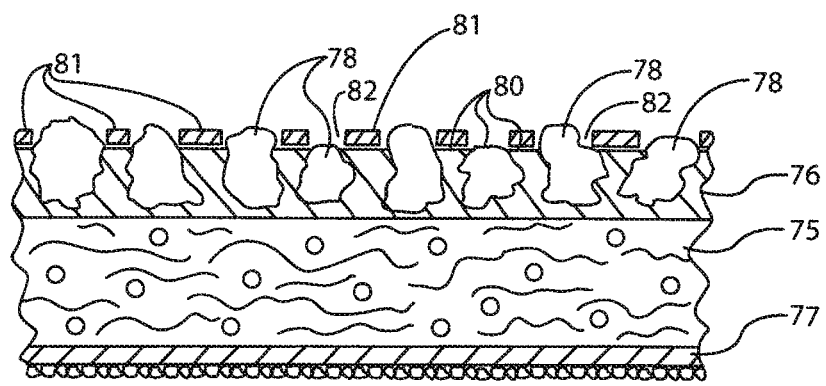
FIG. 2 is an enlarged fragmentary illustration, taken through a roof covering material made in accordance with any of the techniques illustrated in FIGS. 1, 1A, 1B, 1C or 1D, from the right end of such illustrations, and wherein the discontinuous nature of the top layer is illustrated, applied to the upper layer of the bitumen and some of the exposed granules as shown in FIG. 2.

With reference now to FIG. 2, a fragmentary illustration of a roof covering material is shown, in the form of a longitudinal section through any of the roof covering materials made in accordance with any of FIGS. 1, 1A, 1B, 1C and 1D, at the right end of those illustrations. Thus, a substrate in the form of a fiberglass felt 75 or the like, may have a bitumen layer such as asphalt 76, applied thereto, from station 26 of FIG. 1, on an upper surface of the substrate 75, with another layer 77 of bituminous coating beneath the substrate 75, and with granules 78 at least partially embedded in layer 76, but generally having portions upwardly protruding, as shown in FIG. 2, such that the granules 78 and upper surface of the bitumen layer 76 presenting an upper surface 80, to which a discontinuous top layer 81 is applied, with the layer 81 having openings or voids 82 therein, for passage of fluids therethrough, as described above with respect to FIGS. 1, 1A, 1B, 1C and 1D.

Figure 3:
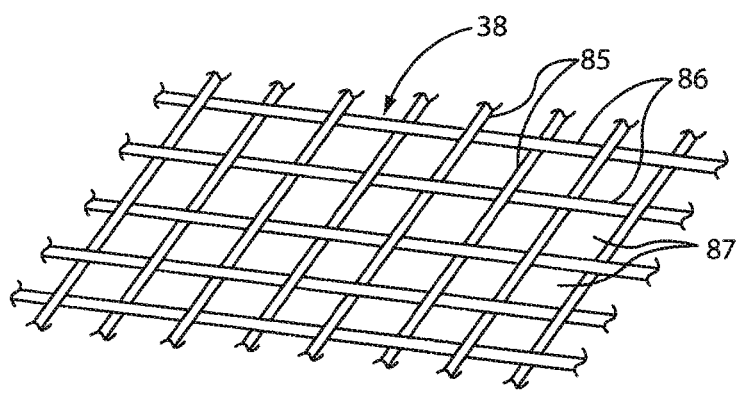
FIG. 3 is a fragmentary perspective illustration of a mesh or net type of discontinuous top layer, in which the discontinuous nature is in the form of openings in a grid.

With reference to FIG. 3, it will be seen that a web or net 38 may be applied, in the manner illustrated in FIG. 1, with such web or net being comprised of a grid of strands at right angles to each other, such as the strands 85, 86. It will be seen that a web or net may take on various other configurations other than strands as shown essentially at right angles in FIG. 3, as may be desired. Such a net could be made in accordance with any of U.S. Pat. Nos. 3,749,535; 4,038,008; 4,152,479 and/or 4,434,199 or any other like patents, the disclosures of which are herein incorporated by reference.

Figure 4:
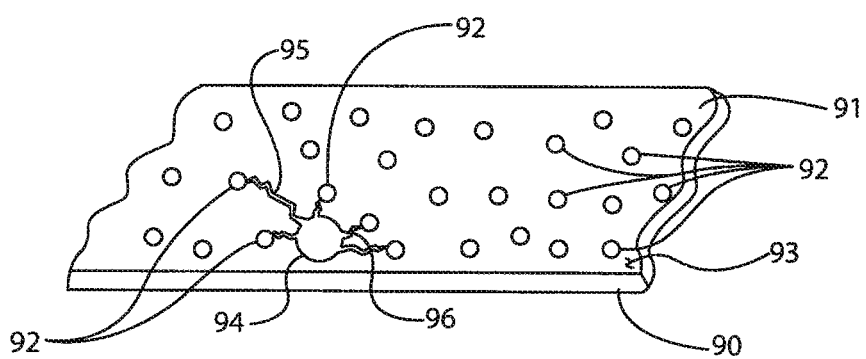
FIG. 4 is a fragmentary perspective illustration of another type of discontinuous top layer, in which a plurality of openings are shown, allowing for passage of fluids therethrough, and wherein an impact is shown applied to the discontinuous top layer, which impact results in cracks that are interrupted by the voids or openings of the discontinuous top layer.

With reference to FIG. 4, an alternative discontinuous top layer 90 is fragmentally illustrated, that may be applied in the form of a roll 36 as illustrated in FIG. 1, or in any other manner. The discontinuous top layer 90 may comprise a sheet 91, having a plurality of voids or openings 92 therein, for passage of fluids therethrough, as described above with respect to FIGS. 1, 1A, 1B, 1C and 1D or in any other manner.

In FIG. 4, there is shown the upper surface 93 of the discontinuous top layer 90 struck by something such as sleet, ice, snow, a tree limb or the like, resulting in an impact zone 94, that causes the formation of cracks such as those 95 and 96, that emanate outwardly from the struck zone 94, but having the various cracks such as those 95, 96, intercepted by the openings or voids 92, as shown, to limit the extent of crack propagation. It will be understood that the voids 87 of FIG. 3 likewise limit the extent of crack propagation in a similar manner to that of the voids 92 of FIG. 4.

The discontinuous top layers of any of the above-mentioned illustrations could be applied via a powder coating application, with or without a heat application shortly thereafter to fuse the powder to the substrate. Also, the discontinuous top layer could be comprised of a solvent based solution, waterborne dispersion or neat resin, curable by physical or chemical means, including but not limited to heat, U.V. radiation, electron beam application or other means.

It will also be understood that the openings or voids 87 or 92 may be pre-planned or programmed to provide direction for crack propagation, during the course of the manufacture or application of the discontinuous top layer, in accordance with this invention.

It will be apparent from the forgoing that various modifications may be made in the details of this invention, and that the roof covering material of this invention may take on many forms. For example, the total surface area of the granules may be enveloped by at least one of the bituminous material coating and the discontinuous top layer in various amounts, for example, within a coverage range of about 2% to about 70%, but the same would more preferably be within a range of at least about 5% up to about 50% total surface area of granules being enveloped. Also, the granules can comprise about 70% of the bituminous top layer, and that it would be more preferable that the surface area of the granules comprise at least about 80% of the bituminous top layer. The discontinuous top layer can comprise at least about 2% of the weather-exposed side, and more preferably, at least in excess of 5% of the weather-exposed side of the roof covering material. Most preferably, the discontinuous top layer covers at least a major portion of the layer of granules, although the granules can have an aggregate exposed area through the discontinuous top layer, within a range of about 20% to about 60% exposure. The discontinuous top layer will preferably have a thickness between about 12 micrometers and 50 micrometers. While various modifications may be made of the roof covering material of this invention, as well as in the techniques for manufacturing the same, such will be within the spirit and scope of the invention as defined in the appended claims.

The invention claimed is:

1. A method of manufacturing roof covering material comprising the steps of:
   (a) providing a substrate having a first upper surface and a first lower surface;
   (b) applying a bituminous material coating on at least the first upper surface of the substrate;
   (c) applying a layer of granules at least partially embedded in said bituminous material coating to present thereon a second upper surface;
   (d) adhering a discontinuous top layer to the second upper surface; and
   further including the step of chemically treating the second upper surface prior to the adhering step of clause (d), to pre-treat the second upper surface for selective adherence of the discontinuous top layer to only some portions of the area of the second upper layer.

2. The method of claim 1, wherein the adhering step of clause (d) includes applying a polymeric material thereto.

3. The method of claim 2, including the step of making openings in the discontinuous top layer for passage of fluid from said second upper surface, through said discontinuous top layer, to avoid entrapment of fluids beneath said discontinuous top layer and for reducing crack propagation by interrupting growth of cracks that may occur in said discontinuous top layer and wherein the discontinuous top layer is applied over at least a major portion of second upper surface.

4. The method of claim 1, including the step of making openings in the discontinuous top layer for passage of fluid from said second upper surface, through said discontinuous top layer, to avoid entrapment of fluids beneath said discontinuous top layer.

5. The method of claim 1, wherein the discontinuous top layer is applied over at least a major portion of second upper surface.

6. The method of claim 1, including the step of making openings in the discontinuous top layer for reducing crack propagation by interrupting growth of cracks that may occur in said discontinuous top layer.

7. A method of manufacturing roof covering material comprising the steps of:
   (a) providing a substrate having a first upper surface and a first lower surface;
   (b) applying a bituminous material coating on at least the first upper surface of the substrate;
   (c) applying a layer of granules at least partially embedded in said bituminous material coating to present thereon a second upper surface;
   (d) adhering a discontinuous top layer to the second upper surface including applying a polymeric material thereto; and
   further including the step of subsequently partially removing a portion of the discontinuous top layer, after its application to the second upper surface.

8. The method of claim 7, wherein the adhering step of clause (d) includes applying a polymeric material thereto.

9. The method of claim 8, including the step of making openings in the discontinuous top layer for passage of fluid from said second upper surface, through said discontinuous top layer, to avoid entrapment of fluids beneath said discontinuous top layer and for reducing crack propagation by interrupting growth of cracks that may occur in said discontinuous top layer and wherein the discontinuous top layer is applied over at least a major portion of second upper surface.

10. The method of claim 7, including the step of making openings in the discontinuous top layer for passage of fluid from said second upper surface, through said discontinuous top layer, to avoid entrapment of fluids beneath said discontinuous top layer.

11. The method of claim 7, wherein the discontinuous top layer is applied over at least a major portion of second upper surface.

12. The method of claim 7, including the step of making openings in the discontinuous top layer for reducing crack propagation by interrupting growth of cracks that may occur in said discontinuous top layer.

13. A method of manufacturing roof covering material comprising the steps of:
   (a) providing a substrate having a first upper surface and a first lower surface;
   (b) applying a bituminous material coating on at least the first upper surface of the substrate;
   (c) applying a layer of granules at least partially embedded in said bituminous material coating to present thereon a second upper surface;
   (d) adhering a discontinuous top layer to the second upper surface, and
   including the step of making openings in the discontinuous top layer for reducing crack propagation by interrupting growth of cracks that may occur in said discontinuous top layer.

14. A method of manufacturing roof covering material comprising the steps of:
   (a) providing a substrate having a first upper surface and a first lower surface;
   (b) applying a bituminous material coating on at least the first upper surface of the substrate;
   (c) applying a layer of granules at least partially embedded in said bituminous material coating to present thereon a second upper surface;
   (d) adhering a discontinuous top layer to the second upper surface, and including the step of making openings in the discontinuous top layer for passage of fluid from said second upper surface, through said discontinuous top layer, to avoid entrapment of fluids beneath said discontinuous top layer and for reducing crack propagation by interrupting growth of cracks that may occur in said discontinuous top layer and wherein the discontinuous top layer is applied over at least a major portion of second upper surface.

* * * * *